June 8, 1943.  S. D. RUSSELL  2,321,250
SEALING DEVICE
Filed Jan. 4, 1941
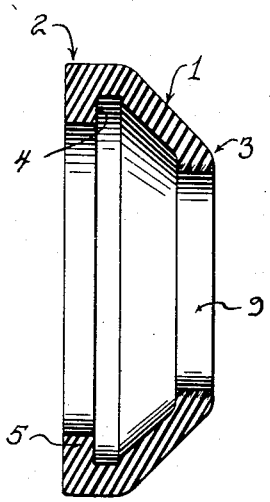
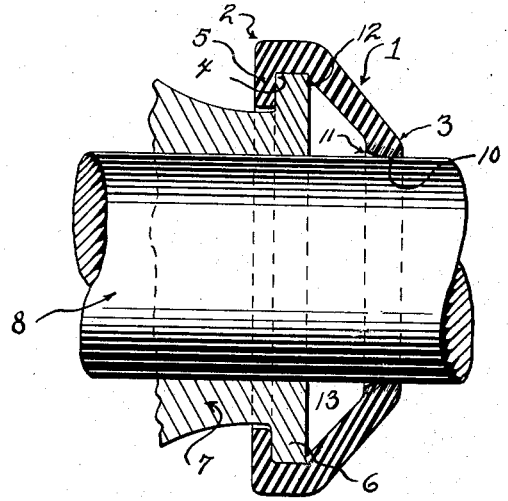
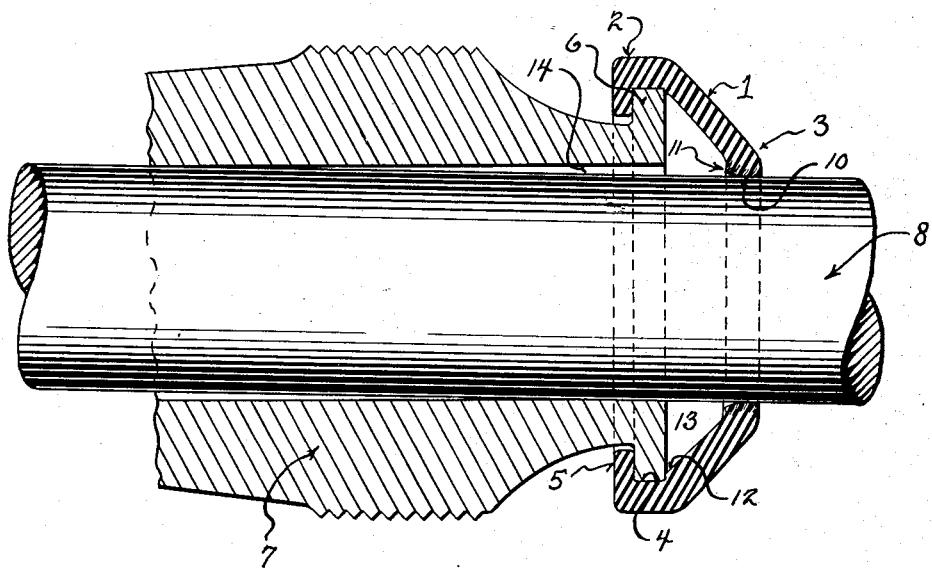
Inventor
Stanley D Russell
By
Emerson B Donnell
Attorney Patented June 8, 1943

2,321,250

UNITED STATES PATENT OFFICE 2,321,250

SEALING DEVICE

Stanley D. Russell, Racine, Wis., assignor to J. I. Case Company, Racine, Wis., a corporation Application January 4, 1941, Serial No. 373,063

2 Claims. (Cl. 286—5)

The present invention relates to sealing means and an object thereof is to generally improve the construction and operation of devices of this class.

A further object is to provide a sealing means for the end of a bearing, wheel hub or the like, which will prevent the entrance of dirt or other deleterious material between the bearing or hub and its shaft or axle.

Further objects are to provide such a sealing means which will be simple to manufacture and apply or use, which will provide a reservoir for lubricant, which will furnish a positive seal under substantially all conditions, which will be resistant to grease or oil, which will accommodate itself to wear or misalignment of the parts, and which will carry its own lubricating expedient which is independent of any lubricant supplied to the bearing or hub. An illustrative embodiment of the invention is described in the annexed specification and illustrated in the accompanying drawing in which Figure 1 is an axial sectional view of a sealing means embodying the invention.

Fig. 2 is a similar view of the device in place upon a hub and axle.

Fig. 3 is a similar view of the device in place on a hub which has suffered extreme wear.

The illustrative device includes the body portion generally designated as 1, formed of rubber or other suitable material which is flexible and elastic. Any of the synthetic products resistant to grease and oil and having properties similar to soft rubber are contemplated. Body portion 1 is made for convenience in the present instance, in the shape of a frustrum of a cone, although other configurations are contemplated as equivalent. Body portion 1 has a securing or attaching portion generally designated as 2 and a sealing portion generally designated as 3 which because of the generally conical configuration of the body are spaced axially from each other an appreciable distance for a purpose to appear.

Attaching means 2 comprises a flange engaging rim or collar having an inner groove 4 and an inwardly directed flange 5, groove 4 being adapted to fit over a flange 6, Fig. 2, on a hub or bearing portion 7 supported on or carrying a shaft or axle 8. Flange 5 extends inwardly on the opposite side of flange 6 from body portion 1 and prevents inadvertent removal of the device from hub 7. Owing to the inherent resiliency of the material of the device, it may be quite readily stretched over flange 6 and snapped into place, the parts being so proportioned that the device is locked in place by its resiliency against all but intentional removal.

As above mentioned, sealing portion 3 is spaced axially from attaching portion 2 and includes a substantially cylindrical or other suitable bore 9 for engaging shaft 8, bore 9 being slightly smaller in diameter than shaft 8 or any shaft with which a given size of sealing means is to be used, so that the contractive tendency of the rubber-like material will hold the surface of bore 9 in sealing contact with shaft or axle 8. To minimize the friction between bore 9 and shaft 8, the material for a suitable distance in from surface 10 is impregnated or has incorporated therein a lubricant, such for example as graphite or other material which will tend to modify the characteristics of the elastic material for an easy sliding movement relative to the shaft 8. By virtue of this, the sealing means can be run on the shaft without other lubrication.

Groove 4 may be proportioned enough smaller, in the relaxed state of the device than flange 6, so that an appreciable amount of stretching is necessary when the sealing device is in place on the flange. This may serve for an advantageous purpose as follows: Such stretching of attaching portion 2 distorts substantially the whole of body portion 1 as indicated in Fig. 2, causing an increase in the angle of the frusto-conical body portion. This distortion carries through to surface 10 and changes it from a substantially cylindrical bore to a frusto-conical or similar bore having an outward taper. The parts may be proportioned that this distortion will increase the size of bore 9 inwardly slightly over that of shaft 8, the outward or remaining portion of bore 9 engaging the shaft with increasing pressure, thus causing a very definite and positive sealing action at the outermost margin of sealing portion 3. This may result in a slight clearance as indicated at 11, in Fig. 2, between surface 10 and shaft 8, which will facilitate the entrance of lubricant from within body portion 1 between shaft 8 and surface 10. Entrance of any material from outwardly of the sealing device along shaft 8 is positively prevented by the increasing sealing pressure toward the outside of sealing portion 3.

Entrance of any material past flange 6 is effectively prevented by the exceedingly tight engagement of attaching means 2 with flange 6 and by contact of flange 5, also with flange 6.

A shoulder 12 formed between groove 4 and the interior of body portion 1 may serve to cause an axial stretching of portion 2 and forcible engagement of flange 5 with flange 6.

In the present instance the end portion of hub or bearing 7 is formed in a plane, normal to shaft 8, the configuration of body portion 1 providing a space 13 which will receive a quantity of lubricant from within hub 7 and retain it for lubrication of sealing surface 10 and also for reintroduction into the bearing between hub 7 and shaft 8.

In the event of a worn bearing as indicated at 14, in Fig. 3, flange 6 may be misaligned an appreciable amount from shaft 8, the axial spacing between attaching means 2 and sealing means 3 providing enough elastic material in body portion 1 to allow an appreciable gyratory movement between flange 6 and shaft 8 without straining sealing means 3 or causing any gap between it and shaft 8. The sealing action is accordingly unimpaired by such wabbling or lateral displacement of the parts and the seal maintained in spite of appreciable wear or other imperfections in the bearing construction.

It is contemplated that other configurations might be used for body portion 1 within the scope of this phase of the invention, the axial spacing of attaching means 2 and sealing portion 3 being largely instrumental in providing the necessary lateral flexibility of the device for accommodating wear or misalignment of the bearing parts. Furthermore, the particular configuration of body portion 1 is not essential insofar as lubricating reservoir 13 is concerned.

In operation, the device of the invention is molded of suitable material and forced over flange 6 during the assembling operation, after which shaft 8 is inserted in the bearing or hub 7 and thrust through sealing bore 9. The bearing may then be lubricated while allowing a portion of the lubricant to find its way into space 13, no further attention to the sealing means being required for a long period of time, ordinarily the life of the machine involved. If hub or bearing 7 is one in which no lubricant will find its way to space 13, the seal will run satisfactorily on shaft 8 by virtue of the lubricant carried in and near the sealing surface 10.

In the appended claims the term "casing" is to be interpreted as applying to hub or bearing 7 or an equivalent structure.

The above being a full and complete description of an illustrative embodiment of the invention, what is claimed as new and desired to be secured by Letters Patent of the United States is:

1. In combination, an apertured casing having an external radial flange at one end thereof about said aperture, a shaft passing through said aperture, a shaft seal including a body of soft elastic grease resistant material, having an annular portion engaging the outer periphery of said flange, said annular portion having an inner relaxed diameter smaller than the outer diameter of said flange, said shaft seal having a portion adapted to surround said shaft and having a nominally cylindrical bore sufficiently smaller than said shaft so that it will be held in contact with said shaft by its elastic qualities, a frusto-conical section connecting said flange engaging portion and said shaft surrounding portion, said frusto-conical section being of substantially uniform thickness between said annular portion and said shaft engaging portion whereby stretching of said flange engaging portion for fitting on said flange will cause distortion of said shaft surrounding portion, such as to cause said nominally cylindrical bore to engage said shaft with increasing pressure toward the outer margin of said bore, and an inwardly extending annular flange formed on said annular portion and engaging the back face of said casing flange.

2. A combination according to claim 1 wherein the inner conical surface of said frusto-conical portion engages the front face of said casing flange where it joins said annular portion.

STANLEY D. RUSSELL.